United States Patent Office 2,762,040
Patented Sept. 4, 1956

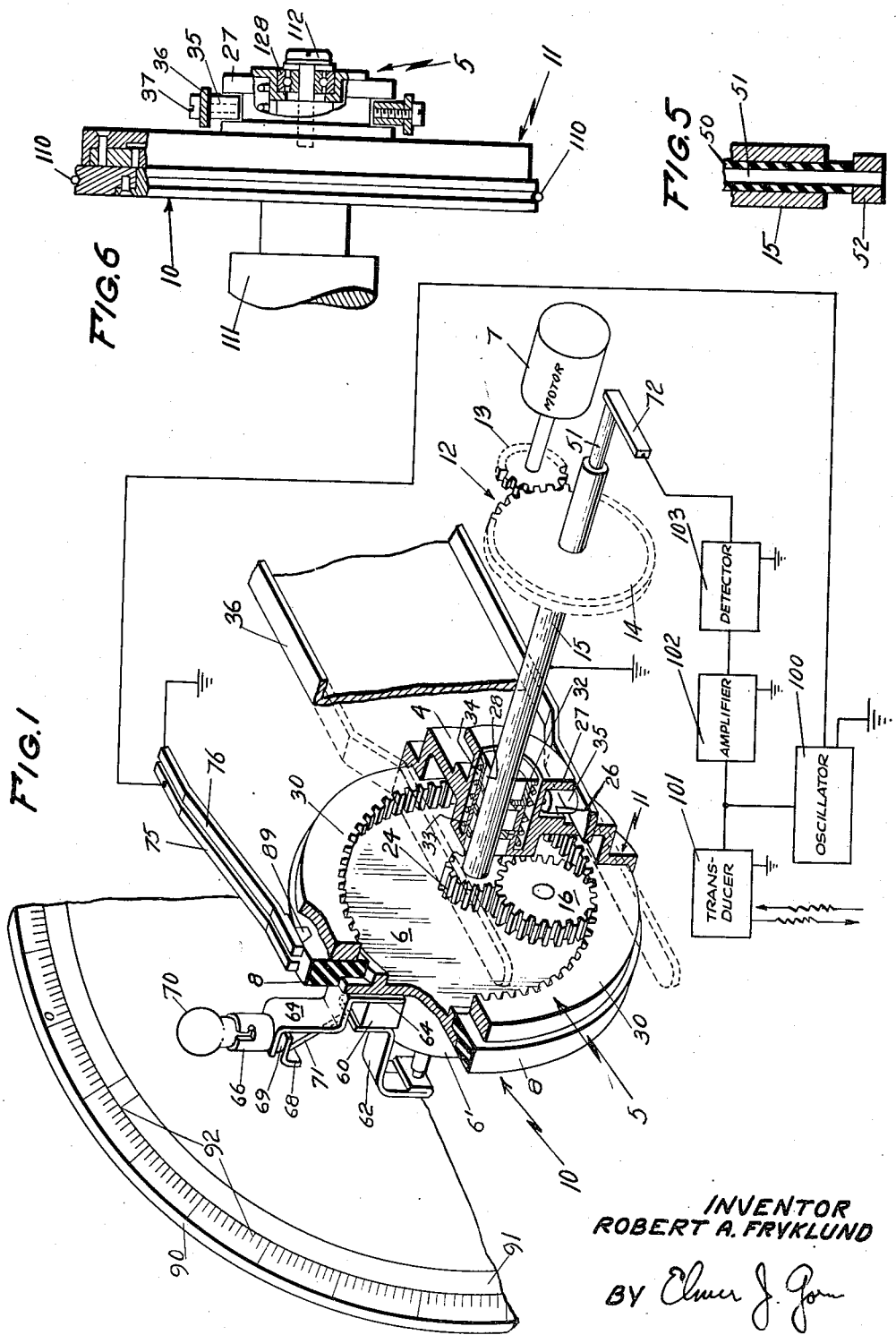

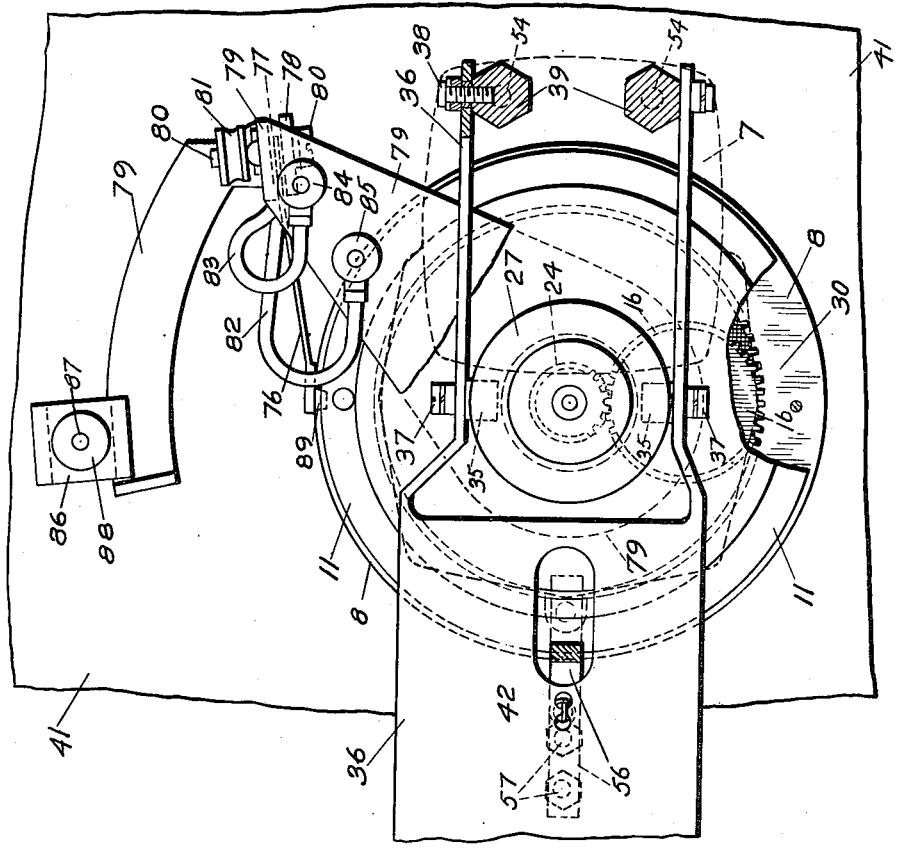

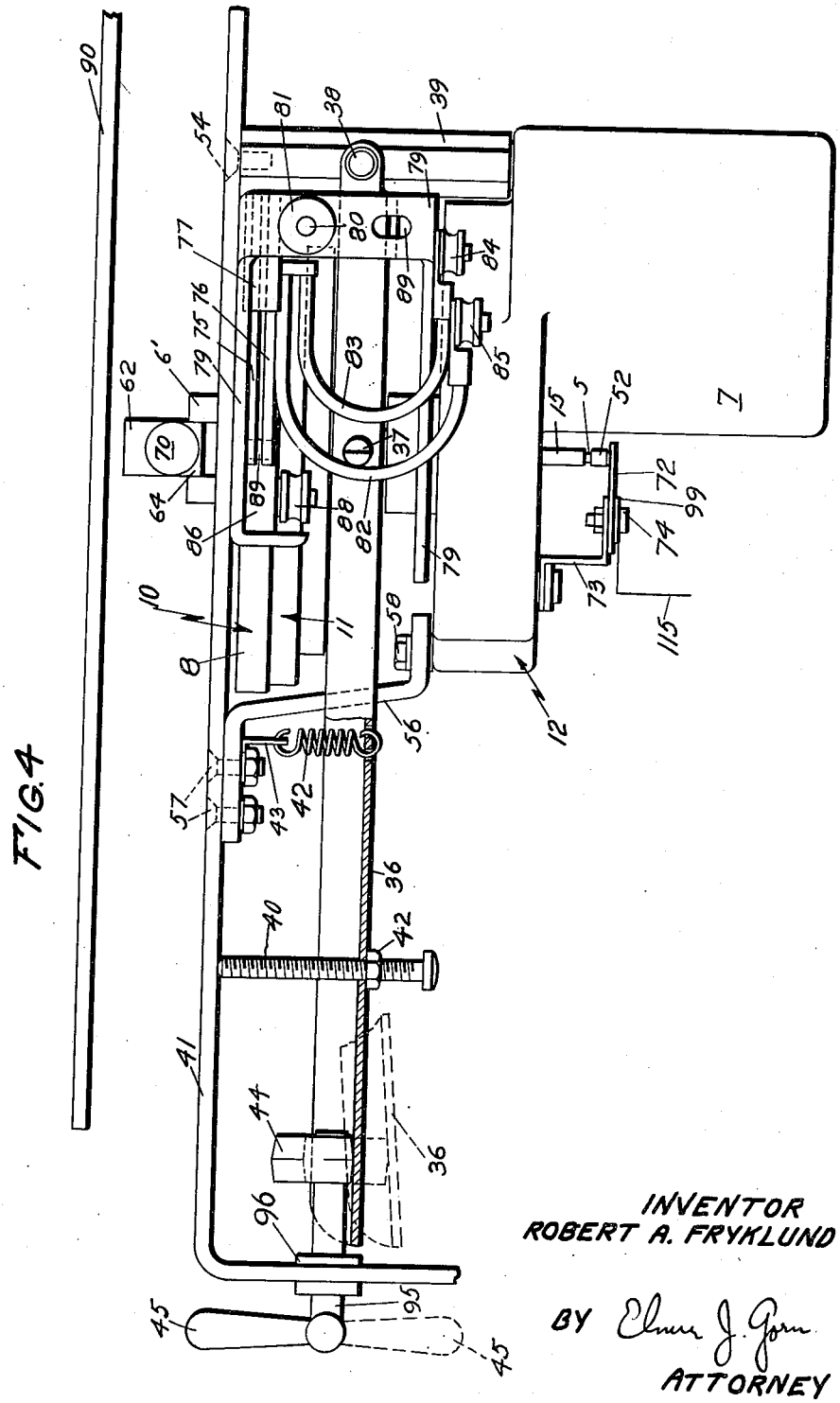

2,762,040

MULTIPLE RANGE INSTRUMENT HAVING CHANGE SPEED GEARING TO OPERATE A MOVABLE INDICATOR

Robert A. Fryklund, Dedham, Mass., assignor to Raytheon Manufacturing Company, Newton, Mass., a corporation of Delaware Application April 29, 1952, Serial No. 285,006

4 Claims. (Cl. 340—378)

This invention relates to an instrument having convenient range-changing means and, more particularly, relates to a multiple-range instrument of the type having a movable indicating member whose velocity may be changed simply and conveniently by predetermined amounts.

In the field of echo depth-sounding instruments of the indicating and recording types, it is desirable to provide a two-range instrument, such as an instrument having both a foot range and a fathom range, while using the same calibration figures of the scale. In this way, problems of calibration are simplified, the instrument may be read more easily and quickly, and the possibility of error inherent in multi-scale instruments is minimized.

Recording type depth-measuring instruments are exemplified by the device described in application, Ser. No. 199,905, of Fryklund, filed October 6, 1949, and instruments of the indicating type by the device described in U. S. Patent No. 2,410,065, to Harrison. Briefly, the movable system in the recording-type instrument preferably comprises a pair of grooved pulleys, one of which is driven by some form of prime mover; said pulleys carry a conductive belt to which a stylus is attached. Each time one of the stylus holders passes beneath a set of keying contact fingers, it keys an electronic oscillator. The output signal from the driver is fed to a transducer which converts the electrical pulses from the oscillator into compressional waves which are directed toward the object whose distance is to be measured. The returning echos are received by the same transducer and converted back into electrical pulses which, after amplification and detection, are allowed to pass through said stylus and electrically-conducting chart paper. The initial pulse is transmitted at the instant the stylus point is at zero on the chart and a mark is made on the paper at this instant. Since the belt continues to revolve and carry the stylus further down the paper during the time interval required for the return of the echo, the stylus is in a new position on the paper upon receipt of said echo. A mark is made on the paper at this instant, thereby indicating the depth from which the echo was returned.

The moving system of the indicating type instrument preferably comprises a driven wheel which carries a lamp and keying segment. The passage of said segment across a stationary set of contacts causes the initiation of a compressional wave signal which is transmitted and reflected from the distant object. The lamp is illuminated in response to a received signal from said object and the angular displacement of the spot of light showing through a transparent calibrated scale serves to indicate depth.

The speed of the driven member, in either case, must be reduced by a factor of six to one in order to convert from the foot range to the fathom range. Possible means of effecting a speed changing in the moving indicating member of either type of instrument comprises either a manual gear shift and a suitably arranged gear train or a gear train designed with various arrangements of over-running clutches whereby a reversal of the driving motor will produce the required speed change. Both of these means have disadvantages. The manually-shifted gears require that the motor be shut off and stopped before shifting gears to avoid damage to the gear teeth or shafting of the gear train resulting from the shock of acceleration; moreover, the gear box becomes unnecessarily complex and bulky. The reversing motor system requires a still more complicated gear box and introduces another troublesome factor in effecting proper compliance of the clutches.

The instrument, according to this invention, utilizes a simple speed changer involving a clutch and a cooperating planetary gear assembly which has none of the above disadvantages and is relatively simple. The speed is shifted normally by means of a lever without gear meshing or stopping the driving motor. The speed may be shifted rapidly from one speed to the other without dangerous clashing of gears or shock to the system because the clutches pick up the change in load gradually. In addition, the disengagement of the clutches and a braking of a portion of the planetary gear assembly may be accomplished by the use of a single lever.

The drive shaft which is driven at a speed that provides the desired "foot" range forms the common axis of the planetary system. On it is floated a first wheel that carries a planetary gear. This wheel can rotate relative to the shaft, but its axial position is fixed on the shaft. An insulating rim is mounted on the periphery of this wheel and serves either as an insulator for the belt when the wheel is grooved for use in an indicating type belt recorder or as an insulator for the contact fingers and keying segment when used in an indicator type recorder; the insulating rim also serves as a clutch face in contact with the side of an annular gear which forms the other face of the clutch for either the recorder or indicator.

A pinion gear is keyed to the shaft, forming one collar which fixes the axial position of the first wheel, and is part of the planetary system. The annular gear is mounted on a second wheel that is provided with a clutch collar on the hub. This second wheel is free to rotate on the shaft, and can also be moved axially for the purpose of disengaging the clutch formed by the first-mentioned wheel and the annular gear carried on the second wheel. The latter is normally forced against the first wheel, a spring and thrust-bearing collar being provided on the second wheel to supply the axial force and thus locking the two wheels together. In this position the planetary gear train is locked and inoperable and the first or driven wheel is forced to rotate at the speed of the drive shaft—or at the "foot" speed.

A clutch fork is arranged to engage the clutch collar on the second wheel and withdraw it axially, against the force of the spring, away from the first wheel. The clutch is thus disengaged and the first wheel is free to move with the planetary gear. In addition, the shoes of the clutch fork, as they are forced against the collar in shifting, serve as brake shoes in frictional engagement with said collar, thereby bringing the second wheel to a stop. The annular gear which is mounted on this wheel is also stopped. The pinion continues to rotate at the shaft speed and, in carrying the planetary gear around within the annular gear, drives the first wheel at reduced speed—in this case, one sixth the original speed—which is the "fathom" speed.

In the drawings:

Fig. 1 is a schematic diagram of a form of multiple range instrument according to the invention;

Fig. 2 is a central longitudinal section view illustrating certain portions of the instrument shown in Fig. 1;

Fig. 3 is a view of the instrument taken along line 3—3 of Fig. 2;

Fig. 4 is a plan view of the instrument shown in Fig. 2;
Fig. 5 is a detail of the end of the shaft; and
Fig. 6 is a fragmentary view of a second embodiment of a multiple range instrument.

Referring now to Figs. 1 to 4 of the drawing, the indicator includes a gear and clutch assembly 5, the clutch portion of which comprises an indicator or driven wheel 10 and a clutch wheel 11, both of which are floated on the shaft 15 and free to rotate relative thereto, as more fully described later. Wheel 10 includes a main body portion 6, preferably in the form of an aluminum casting, a hub portion 6', which is an extension of portion 6 and an electrically-insulating rim 8 mounted on the periphery thereof by screws 9. Shaft 15 is driven through a reduction gear train 12 by means of a constant speed motor 7. The reduction gear train is conventional and includes an input gear 13 keyed to the shaft of motor 7 and an output gear 14 fixedly attached to shaft 15.

A planetary gear 16 riding on a pair of bearings 17 is mounted on wheel 10 by a machine screw 18 located in a counterbored portion of wheel 10. A pilot screw 19 is provided with an internally-threaded portion to receive machine screw 18 and a shank portion against which bearings 17 rest, as shown in Fig. 2. Pilot screw 19 has a slotted head so that the screw may be engaged by a screw driver inserted in a circular opening 20 in wheel 11, as shown in Fig. 2, thereby providing an axial adjustment of planetary gear 16 for gear alignment purposes.

The hub portion 6' of wheel 10 is mounted on a set 21 of ball bearings positioned about shaft 15. The axial position of bearing set 21 along shaft 15 is fixed by a plurality of retainer rings, some of which are positioned in narrow grooves in shaft 15, as represented by reference numerals 22. Other retainer rings 23 are positioned in grooves in hub 6' to separate the the individual bearings of bearing set 21.

A pinion gear 24 is keyed to motor shaft 15 by conventional key 25 and is in alignment with planetary gear 16. Pinion 24 also serves as a collar fixing the axial position of wheel 10. Clutch wheel 11, which like driven wheel 10, may be of cast aluminum, has an enlarged portion or hub 4 containing a circumferential channel 26 and a clutch collar 27, which is a flanged part of hub 4. The hub 4 of clutch wheel 11 is positioned on shaft 15 and rotatable on a set of bearings 28; the latter is prevented from shifting axially along shaft 15 away from the pinion by retainer ring 29, which is identical to rings 22 used with bearing 21.

An internal annular gear 30 is mounted adjacent the outer rim of clutch wheel 11 by means of machine screws 31. Gear 30 is aligned with gears 16 and 24 and the teeth on the inside of gear 30 are in engagement with the teeth of planetary gear 16.

A cylindrical thrust collar 32, shown in Figs. 1 and 2, has a portion projecting inwardly toward shaft 15 and held between two of the bearings of bearing set 28; an outwardly projecting portion of thrust collar 32 provides a face against which one end of a clutch spring 33 rests. Clutch spring 33 fits within a recess 34 in hub 4 of wheel 11 with its other end resting against bottom of said recess, as shown in Fig. 2. A pair of substantially cylindrical clutch shoes 35, which may be made of laminated phenolic, is located within channel 26 in hub 4; the shoes 35 are slightly smaller than the width of channel 26. Each of shoes 35 is provided with a small centrally-located cylindrical bore.

As shown in Fig. 3, a clutch fork 36, tapered at one end, is fastened at the end by screws 38 (see Fig. 4) to two hexagonal metal posts 39, which serve as supports for motor 7. Screws 54 are used to attach posts 39 to panel or frame 41. The combined motor and reduction-gear housing is also supported on panel 41 by a bracket 56 (Fig. 4) fastened to panel 41 by bolts 57 and to the housing by a screw 58. A short distance removed from said end of clutch fork 36, the latter is connected to clutch shoes 35 by means of a pair of pivot screws 37. Screws 37 each have an enlarged threaded portion adapted to be screwed into clutch fork 36, as clearly shown in Fig. 2. A pair of washers is inserted under the heads of screws 37 in the conventional manner. The portion of each of screws 37 remote from the head is of reduced cross section of substantially the same size as the diameter of the bores in the cylindrical clutch shoes 35 and this reduced portion is adapted to fit tightly in said bores so that the clutch shoes may be moved in response to operation of said clutch fork.

The clutch shoes are kept spaced from the flanged portions of clutch wheel 11, including clutch collar 27, by means of a threaded adjusting screw 40, shown clearly in Fig. 4, which is screwed into fork 36 and is forced against panel 41 by spring 42 mounted between a bracket 43 attached by one of bolts 57 to panel 41 and the top surface of fork 36. A nut 42 on screw 40 serves to maintain screw 40 in the desired position. By adjusting the screw 40, the proper axial position of clutch fork 36 is maintained.

As shown in Fig. 4, a change from one range to another is accomplished by a handle 45 which is mounted on a shaft 95, in turn mounted in a bushing 96 in a portion of the instrument frame 41. An eccentrically-mounted cam 44 is rotated by handle 45 into one of two positions. It should be understood that the movement of clutch fork 36 necessary to effect a shifting of the clutch may be accomplished in several ways and the invention is not to be limited to the arrangement shown.

With the clutch fork, as shown in Figs. 2 and 3, that is, with handle 45 and cam 44 in the position shown in full lines in Fig. 4, the clutch is in neutral, that is, the clutch wheel 11, including annular gear 30, is in frictional engagement with indicator wheel 10, being forced against the latter by the axial force exerted by spring 33. This is the position corresponding to the "foot" range. The insulating rim 8 of wheel 10 serves as a clutch face in contact with the side of annular gear 30 which forms the other clutch face. In the position shown in Fig. 2, and in Fig. 4 in full lines, annular gear 30 cannot rotate about shaft 15 on the bearing 28; the planetary gear train comprising gears 16, 24 and 30, therefore, is locked and wheel 10 is driven at the speed of shaft 15, that is, at the speed of the output gear of reduction gear train 12.

If handle 45 is turned through a ninety degree angle, as shown in dotted lines in Fig. 4, cam 44 forces clutch fork 36 to move to the right, as viewed in Figs. 1 and 2, or away from the front portion of frame 41, as shown in Fig. 4 in dotted lines. This movement of the clutch fork causes shoes 35 to be forced against clutch collar 27 on clutch wheel 11, thereby withdrawing wheel 11 axially away from wheel 10 against the force of spring 33 and toward the inwardly projecting portion of thrust collar 32. The clutch is thereby disengaged. The axial movement of wheel 11 and the consequent separation of the clutch faces are quite small, being of the order of .015 inch, so that the alignment of the gears in the planetary gear train is not appreciably affected.

Not only are wheels 10 and 11 now disengaged, but clutch shoes 35 are forced against clutch collar 27, thereby acting as a brake on wheel 11. Since annular gear 30 is mechanically connected to wheel 11, it is also locked in position. Planetary gear 16 is now free to rotate around inside annular gear 30 in the same direction as pinion 24. The gear ratio of the planetary gear train is designed to be six to one so that wheel 10—connected to planetary gear 16 by screw 18—is made to rotate at one sixth its former speed. This speed corresponds to the "fathom" range.

Shaft 15, which provides the common axis of the gear and clutch assembly 5, is hollow, as shown in detail in Fig. 5. A tubular bushing 50 of electrically-insulating material and having an outer diameter substantially equal to the inner diameter or bore of shaft 15 is inserted within the shaft and extends slightly beyond the latter at the ends thereof. An electrical conductor 51, such as a piece of heavy copper wire, is inserted within bushing 50 and fits tightly therein. A long-wearing, electrically-conductive sleeve 52 is soldered to the ends of conductor 51 and ground smooth. Both ends of shaft 15 may be finished alike. The shaft itself is grounded at at least one point.

An electrically-insulating connection block 60 is mounted on wheel 10 by a pair of screws 61. An electrically-conductive spring contact 62 is attached at one end to block 60 by a screw 63. The other end of spring contact 62 is adapted to resiliently engage one end of conductor 51. A metal bracket 64 is fastened against the metallic portion 6 of wheel 10 by the aforesaid block 60. Hub 6' of wheel 10 is connected electrically to grounded shaft 15 by a metallic spring clip 65 which is retained between the retaining rings separating the bearings of bearing set 21. One end of spring clip 65 rests against rotating shaft 15 and the other engages the inner surface of hub 6'.

A conventional bayonet type lamp socket 66 is mounted with its outer shell directly contacting the free end of bracket 64. The inner conductor 67 of socket 66 is connected to a small metal lug or bracket 68. An electrically-insulating washer 69 isolates the two socket terminals. A neon lamp 70 is held within socket 66. A flexible wire lead 71 is soldered to lug 68 and the mounted end of spring contact 62. At the end of shaft 15 remote from 62 a second spring contact 72 is mounted by a bolt 74 at one end of a bracket 73 which is attached to the housing of reduction gear 12 by conventional mounting means. An electrical connection 115 to detector 103 (to be described later) is attached to lug 99, as shown in Fig. 4. This end of shaft 15 is clearly shown in Fig. 4.

A keying assembly for the instrument comprises a pair of resilient contact members 75 and 76 embedded in an insulating block 77 which is attached to contact adjusting arm 78 by a screw (not shown). The block 77 is clamped in a position between lateral contact adjusting arm 78 and a portion of the lamp zero adjustment lever 79 by means of an adjusting screw 80 and nut 81. The lateral position of contacts 75 and 76 may be adjusted by loosening nut 81 and moving arm 78 within slot 89 in lever 79. A pair of leads 82 and 83 has one end connected to one end of contact members 75 and 76, respectively, and the other end to a pair of binding screws 85 and 84, respectively, which are attached to zero adjustment lever 79. Connections (not shown) to electronic oscillator 100 (described later) are also connected to binding screws 84 and 85. Lever 79 is adapted to rotate about the reduced section of the housing of reduction gear 12, and may be clamped to panel 41 at any desired angular position by means of clamp 86 cooperating with a screw 87 and adjusting nut 88. The purpose of zero adjustment lever 79 will be described later. The keying assembly finally includes insert 89 made of an electrically-conductive material and embedded in electrically-insulating rim 8 of wheel 10.

The instrument dial 90 comprises a circular glass plate which, except for the narrow circular portion or slit 91, is rendered opaque to light, as by painting with black paint. The flashes of light of neon lamp 70 show through transparent slit 91 of glass dial 90. The instrument scale comprises a series of index markings 92 marked in white paint over the portion of dial 90 adjacent transparent slit 91.

At each revolution of wheel 10, contacts 75 and 76 pass over electrically-conductive insert 89 in the rim of wheel 10. These contacts are connected to an electronic oscillator 100 which is keyed at the instant of bridging of contacts 75 and 76 by insert 89. The electrical impulses from oscillator 100 are fed to transducer 101 which convert the electrical pulses into compressional waves which are directed toward the object whose distance is to be measured, such as the bottom of a harbor. At the same time, the output of oscillator 100 is fed to an amplifier 102 and detector 103 and the detected output is applied to neon lamp 70 through an electrically-conductive path including spring contact 72, conductor 51, spring contact 62, lead 71, inner terminal of neon lamp 70, outer terminal of lamp 70, socket 66, bracket 64, metallic portion 6 of wheel 10, grounding spring clip 65 (not shown in Fig. 1) and grounded shaft 15.

The returning echos are picked up by transducer 101 and converted back into electrical pulses which are fed to an amplifier 102. The latter increases the power of the received pulse sufficiently to operate neon lamp 70. The amplified pulse 102, after detection in detector 103, is applied to neon lamp 70 through the circuit previously described. By proper adjustment of the lamp zero adjustment lever 79, the keying contacts are so positioned relative to the keying insert 89 in rim 8 that the initial pulse is transmitted at the instant that lamp 70—carried on indicator wheel 10—is opposite the zero point on dial scale 92. Since wheel 10 continues to revolve at a constant speed, determined by the position of gear and clutch assembly 5, the neon lamp is carried to a new position when the echo pulse lights it. The distance traversed by the echo pulse is obtained by observing the index marking 92 opposite the flashing light.

Although the description so far has been limited to the indicating type instrument, the speed change device may be incorporated in a recording instrument of the type previously referred to. As shown in Fig. 6, wheel 10 is grooved to hold a moving belt 110 which carries a stylus (not shown) past a record chart. Wheel 10 serves as a driving pulley and another similar pulley is used in conjunction therewith for carrying moving belt 110. Wheel 10 is driven by a motor, a portion of whose shaft housing 111 is shown in Fig. 6. The gear and clutch assembly 5 is the same as for the indicating type instrument except that the thrust collar bearing 128 is retained by a retaining screw 112.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A dual range distance measuring device particularly adapted for use with pulse echo distance or depth measuring systems comprising a single stationary indicator dial containing only one set of index marks which can be used with one or the other of two sets of numerical indicia corresponding to different distance measuring ranges, an indicator device adapted to produce a visible indication against said dial in response to a received impulse, means for producing continuous motion of said indicator device past said indicator dial at one of two speeds dependent upon the particular range desired, and means for selecting one of said two speeds including a planetary gear speed changer and a single control device for changing the ratio of said speed changer, said speed changer including a first clutch member carrying said indicating device and a second clutch member engaging said first clutch member only when said control device is in one of two positions, said second clutch member being disengaged from said first clutch member when said control device is in the other of said two positions.

2. A dual range distance measuring device particularly adapted for use with pulse echo distance or depth measuring systems comprising a single stationary indicator dial containing only one set of index marks which can be used with one or the other of two sets of numerical indicia corresponding to different distance measuring ranges, an indicator device adapted to produce a visible indication against said dial in response to a received impulse, means for producing continuous motion of said indicator device past said indicator dial at one of two speeds dependent upon the particular range desired, and means for selecting one of said two speeds including a planetary gear speed changer and a single control device for changing the ratio of said speed changer, said speed changer including a first clutch member carrying said indicating device and a second clutch member engaging said first clutch member only when said control device is in one of two positions, said second clutch member being disengaged from said first clutch member when said control device is in the other of said two positions, said first clutch member carrying a planetary gear, said second clutch member carrying an annular gear and mounted for axial movement along said shaft, said shaft having fixedly attached thereto a pinion gear which at all times is in engagement with said planetary gear and said annular gear.

3. A dual range distance measuring device particularly adapted for use with pulse echo distance or depth measuring systems comprising a single stationary indicator dial containing only one set of index marks which can be used with one or the other of two sets of numerical indicia corresponding to different distance measuring ranges, an indicator device adapted to produce a visible indication against said dial in response to a received impulse, means for producing continuous motion of said indicator device past said indicator dial at one of two speeds dependent upon the particular range desired, and means for selecting one of said two speeds including a planetary gear speed changer and a single control device for changing the ratio of said speed changer, said speed changer including a first clutch member carrying said indicating device and a second clutch member engaging said first clutch member only when said control device is in one of two positions, said second clutch member being disengaged from said first clutch member when said control device is in the other of said two positions, said first clutch member carrying a planetary gear, said second clutch member carrying an annular gear and mounted for axial movement along said shaft, said shaft having fixedly attached thereto a pinion gear which at all times is in engagement with said planetary gear and said annular gear, said first clutch member including an electrically insulated outer portion forming one clutch face, a portion of said annular gear forming the other clutch face.

4. A dual range distance measuring device particularly adapted for use with pulse echo distance or depth measuring systems comprising a single stationary indicator dial containing only one set of index marks which can be used with one or the other of two sets of numerical indicia corresponding to different distance measuring ranges, an indicator device adapted to produce a visible indication against said dial in response to a received impulse, means for producing continuous motion of said indicator device past said indicator dial at one of two speeds dependent upon the particular range desired, and means for selecting one of said two speeds including a planetary gear speed changer and a single control device for changing the ratio of said speed changer, said speed changer including a first clutch member carrying said indicating device and a second clutch member engaging said first clutch member only when said control device is in one of two positions, said second clutch member being disengaged from said first clutch member when said control device is in the other of said two positions, said second clutch member including a hub portion which is slotted to receive a portion of said control device and which is recessed to receive a clutch spring, said second clutch member at one end of said clutch spring being restrained against axial movement along said shaft.

References Cited in the file of this patent

UNITED STATES PATENTS

| | | |
|---|---|---|
| 1,240,318 | Copeland | Sept. 18, 1917 |
| 1,631,458 | Belden | June 7, 1927 |
| 2,350,994 | Anderson | June 13, 1944 |
| 2,397,175 | White | Mar. 26, 1946 |
| 2,475,363 | Turner | July 5, 1949 |

FOREIGN PATENTS

| | | |
|---|---|---|
| 16,053 | Great Britain | May 7, 1914 |